United States Patent
McElroy

(10) Patent No.: US 7,284,296 B2
(45) Date of Patent: Oct. 23, 2007

(54) CAR WASH BLOWER CONTROL

(75) Inventor: Christopher Patrick McElroy, Glendale, AZ (US)

(73) Assignee: Proto-Vest, Inc., Glendale, AZ (US)

( * ) Notice: Subject to any disclaimer, the term of this patent is extended or adjusted under 35 U.S.C. 154(b) by 699 days.

(21) Appl. No.: 10/792,049

(22) Filed: Mar. 3, 2004

(65) Prior Publication Data

US 2004/0250372 A1   Dec. 16, 2004

Related U.S. Application Data

(60) Provisional application No. 60/477,550, filed on Jun. 11, 2003.

(51) Int. Cl.
*F26B 21/00* (2006.01)

(52) U.S. Cl. ............. 15/316.1; 15/312.1; 34/666; 251/326

(58) Field of Classification Search ............. 15/312.1, 15/316.1; 34/366 X; 251/326
See application file for complete search history.

(56) References Cited

U.S. PATENT DOCUMENTS

| | | | | |
|---|---|---|---|---|
| 2,835,469 A | * | 5/1958 | Rothenberger | ............. 251/326 |
| 3,011,203 A | * | 12/1961 | Holtzclaw | ............. 15/312.1 |
| 3,163,879 A | * | 1/1965 | Lamb | ............. 15/312.1 |
| 3,805,410 A | | 4/1974 | Rupp | |
| 3,996,750 A | * | 12/1976 | Brear | ............. 251/326 |
| 4,836,467 A | | 6/1989 | Rodgers | |
| 5,421,102 A | * | 6/1995 | McElroy et al. | ............. 34/666 |
| 5,901,461 A | * | 5/1999 | McElroy et al. | ............. 34/666 |
| 5,960,564 A | * | 10/1999 | McElroy et al. | ............. 34/666 |
| 6,449,877 B1 | | 9/2002 | Cote et al. | |
| 6,519,872 B2 | | 2/2003 | McElroy et al. | |
| 6,745,497 B2 | * | 6/2004 | McElroy | ............. 34/666 |

* cited by examiner

*Primary Examiner*—Theresa T. Snider
(74) *Attorney, Agent, or Firm*—Dickinson Wright, PLLC

(57) ABSTRACT

A valve plate (54) is slidably moved on a frame (52) by an actuator (62) between open and closed positions to control the supply of air sucked into the inlet (44) of a blower system (40) that supplies pressurized air through an outlet (46) to a plenum (12) for distribution to said nozzle (16, 18). By disposing the valve plate (54) at the inlet, the blower motor (49) may run continuously without a load as the impeller is not pumping air when there is no demand to blow the water from a vehicle.

11 Claims, 5 Drawing Sheets

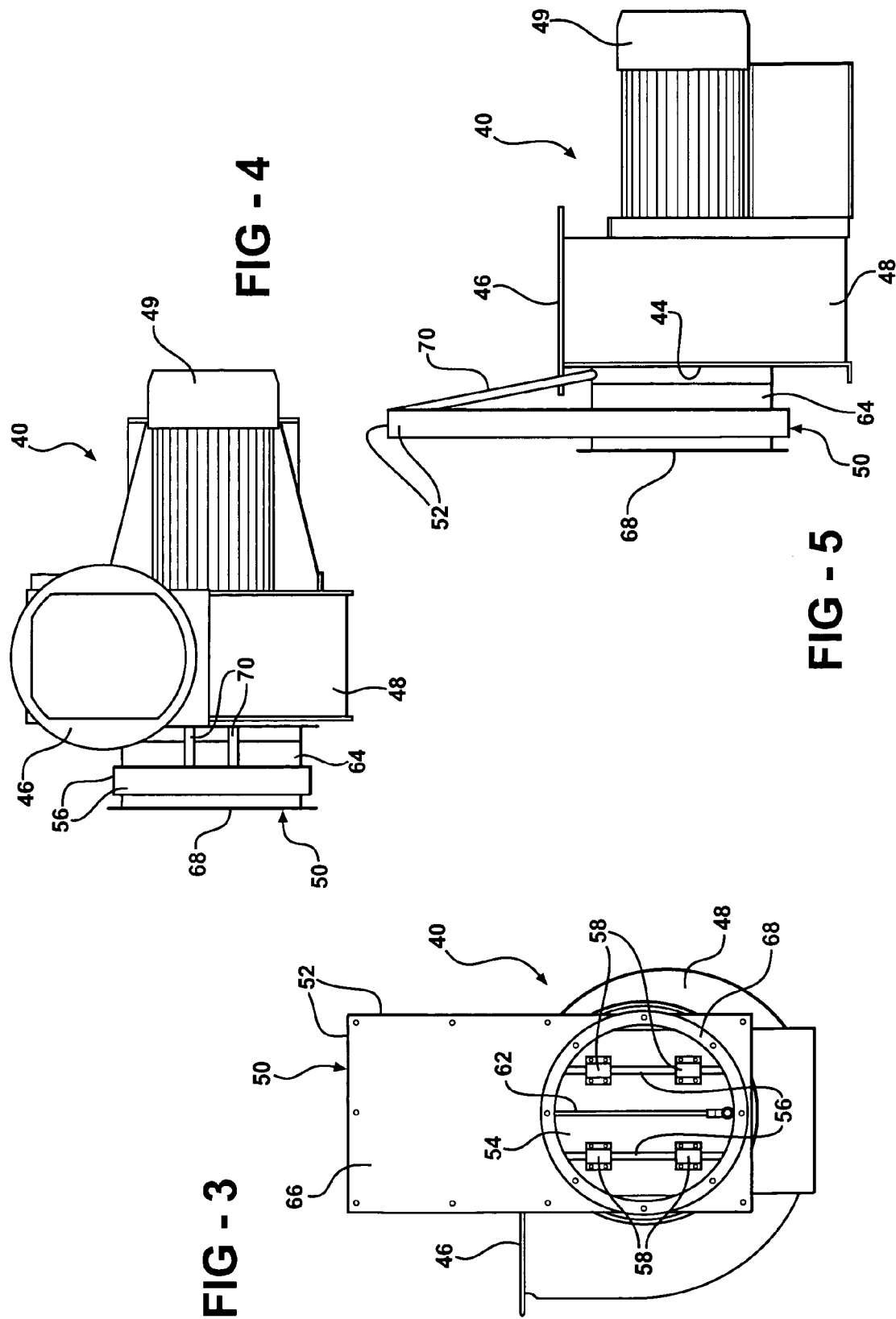

CAR WASH BLOWER CONTROL

CROSS-REFERENCES TO RELATED APPLICATIONS

This application claims the benefit of provisional application 60/477,550 filed Jun. 11, 2003.

BACKGROUND OF THE INVENTION

1. Field of the Invention

The subject invention relates to an assembly for blowing liquids from the surface of a vehicle in a car wash.

2. Description of the Related Art

Assemblies for blowing liquids from a vehicle are well known and typically include a plenum for distributing air to a plurality of nozzles that direct air from the plenum toward a vehicle. The plenum is supplied air by a blower system having an inlet for sucking air in and an outlet for supplying pressurized air to the plenum for distribution to the nozzles. Such blowers include an impeller that is rotated in a housing by an electric motor, the impeller acting as a pump or compressor to pressurize air and force it into the plenum system.

There are significant periods during the operation of a car wash that there is no demand for blowing liquid from a vehicle, i.e., periods without a vehicle passing through the car wash. It is generally very detrimental to an electric motor to start and stop the motor. It is much more efficient in electrical power usage and maintenance of the electric motor to run the motor continuously. This problem has been approached by controlling the delivery of pressurized air from the blower impeller by controlling the flow of pressurized air in the outlet from the impeller, as disclosed in U.S. Pat. No. 4,836,467 to Rodgers. However, during the idle periods of no demand, the motor and impeller remain under load, and sometimes an increased load because of backpressure.

BRIEF SUMMARY OF THE INVENTION AND ADVANTAGES

The subject invention provides an improved blower control in an assembly for blowing liquids from a vehicle of the type including a plenum for distributing air to at least one nozzle for directing air from the plenum toward a vehicle with a blower system having an inlet for sucking in air and an outlet for supplying pressurized air to the plenum for distribution to the nozzle. The assembly is characterized by a valve mechanism disposed over the inlet for controlling the amount of air sucked into the inlet.

Accordingly, the subject invention allows the electric motor to be run continuously but without a load as air is unavailable through the inlet to compress or pump. Without a load, the motor uses less electrical energy and is subject to less wear and tear, thereby reducing maintenance.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 3 is an end view of the blower assembly of the subject invention;

FIG. 4 is a top view of FIG. 3;

FIG. 5 is a side view of FIG. 3;

DETAILED DESCRIPTION OF THE INVENTION

Referring to the Figures, wherein like numerals indicate like parts throughout the several views, an assembly for blowing liquids from a vehicle is generally shown at 10.

The assembly comprises a support plenum 12 for distributing air. A nozzle system is generally indicated at 14 and includes a nozzle 16 for directing air toward the top of a vehicle. The nozzle 16 comprises a flexible material, such as a fabric as is well known in the art. In addition, the assembly includes side nozzles systems, generally shown at 18 for directing air from the side legs of the plenum 12, as is well known and shown in the aforementioned U.S. Pat. No. 5,960,564.

Figure 1:
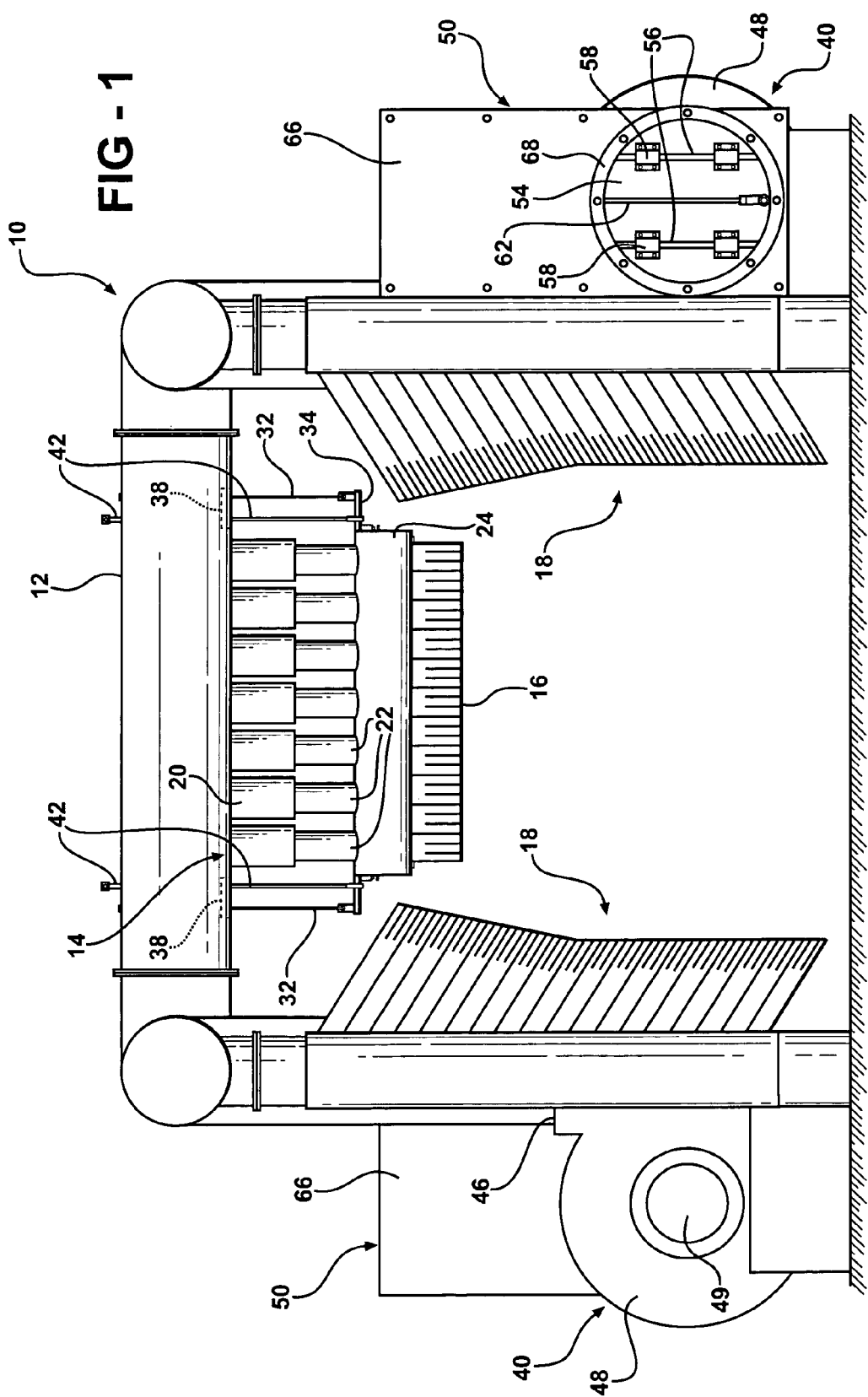
FIG. 1 is a frontal view of a typical car wash water removal system with which the subject invention may be used.
Figure 2:
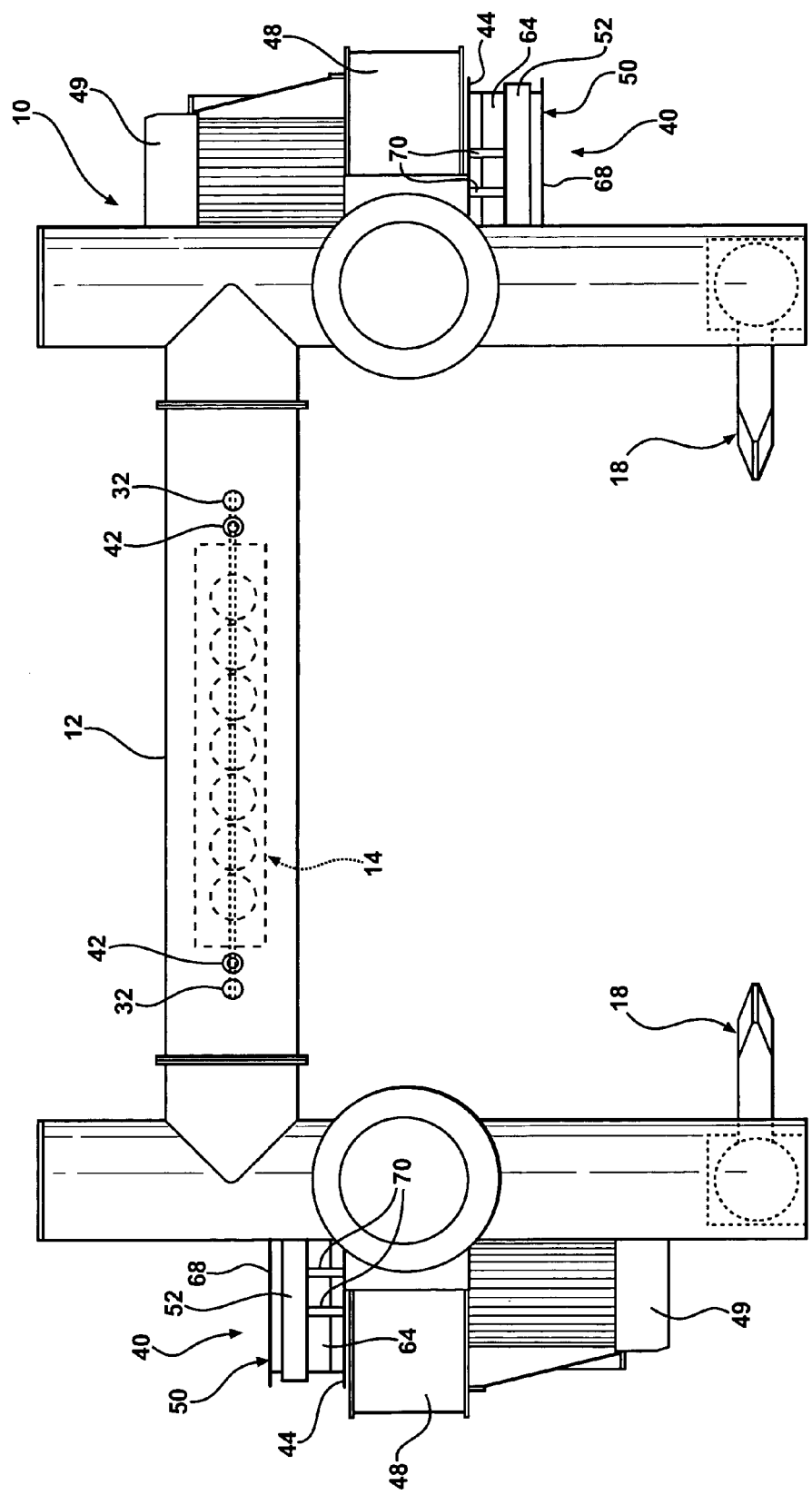
FIG. 2 is a top view of the system shown in FIG. 1.

As more specifically described in application Ser. No. 09/849,165 filed May 04, 2001, now U.S. Pat. No. 6,519,872, an air delivery conduit, including a plurality of pairs of telescoping tubes 20 and 22, interconnects the plenum 12 and the nozzle system 14 for delivering air from the plenum 12 to the nozzle system 14 while allowing the nozzle system 14 to move in an adjustment direction toward and away from the plenum 12 between various vertical operating positions. The telescoping tubes 20 and 22 include a base tube 20 extending from the support plenum 12 and a movable tube 22 in telescoping relationship with the base tube 20 and attached to the nozzle system 14. The tubes 20 and 22 are rigid and self-supporting and may be made of various materials such as metal or plastic. The tubes 20 and 22 are circular in cross section, as shown in phantom in FIG. 2, and have a close or airtight fit. There may be a sliding seal incorporated between the tubes 20 and 22 to effect an air tight seal to prevent the leakage of air as the movable tubes 22 are moved into and out of the fixed or base tubes 20. The base tubes 20 are welded or otherwise fastened to the support plenum 12.

The nozzle system 14 is elongated and includes a fixed outer and upper shell 24 and a movable lower or inner shell (not shown) movably supported by the fixed shell 24. The movable tubes 22 are attached to the fixed shell 24 by welding or fasteners. The inner or movable shell is rotatably supported within the fixed shell 24 as the fixed shell 24 has an elongated opening along the bottom for the passage of air into the nozzle 16 and the movable shell has an elongated opening along the top to accommodate the rotational movement of the movable shell about a nozzle axis which is at the center of the circular shells.

The nozzle system 14 is suspended by bungee chords 32 which are attached to a cross bar 34, the cross bar 34 supporting the fixed shell 24. The bungee chords 32 extend upwardly to an upper end 38 secured to the plenum 12 and act as a spring to react between that upper end 38 and the cross bar 34 to lift the nozzle system 14 in the event of loss of power, or the like.

An actuator in the form of a pneumatic cylinder 42 is included for moving the nozzle system 14 between the operating positions whereby the nozzle system 14 may be moved up and down to accommodate the changing longitudinal configuration of a vehicle. The piston of the pneumatic cylinder 42 is attached to the cross bar 34 to move the nozzle system 14 up and down between raised and lowered operating positions. The bungee chords 32 act as a biasing system for automatically retracting the nozzle system 14 toward the raised operating position in response to loss of control by the actuator 42.

The assembly also includes a rotary drive for rotating the nozzle 16 about the nozzle axis extending transversely to the adjustment direction and the nozzle 16 whereby the nozzle system 14 may be rotated about the nozzle axis to efficiently direct air against the contour of the vehicle.

The assembly 10 also includes a blower system, generally shown at 40, having an inlet 44 for sucking in air and an outlet 46 for supplying pressurized air to the plenum 12 for distribution to the nozzles 16 and 18. The blower system 40 includes a housing 48 surrounding an impeller and an electric motor 49 for rotating the impeller, as well known in the art. As illustrated, a blower system 40 is disposed on each side of the assembly with the blower system on opposite sides extending axially of the system 10 in opposite directions, but they may extend in the same direction, i.e., be mirror images of one another.

The invention is characterized by a valve mechanism, generally indicated at 50, disposed over the inlet 44 for controlling the amount of air sucked into the inlet 44.

It is to be understood that the subject valve mechanism 50 can be used to control pressurized air to various different blower systems and that the blower system described above is but exemplary of the environment in which the invention has utility. A more preferred embodiment of the above described blower system is set forth in U.S. patent application Ser. No. 10/280,914 filed Oct. 25, 2002, now U.S. Pat. No. 6,745,497 granted Jun. 8, 2004, in the name of the inventor herein. Additional blower systems in which the instant invention has utility are described in U.S. Pat. Nos. 5,421,102 and 5,901,461.

Accordingly, the subject invention in the valve mechanism 50 is applicable to any blower system in an assembly for blowing liquids from a vehicle comprising a plenum for distributing air and at least one nozzle for directing air from the plenum toward a vehicle.

Figure 7:
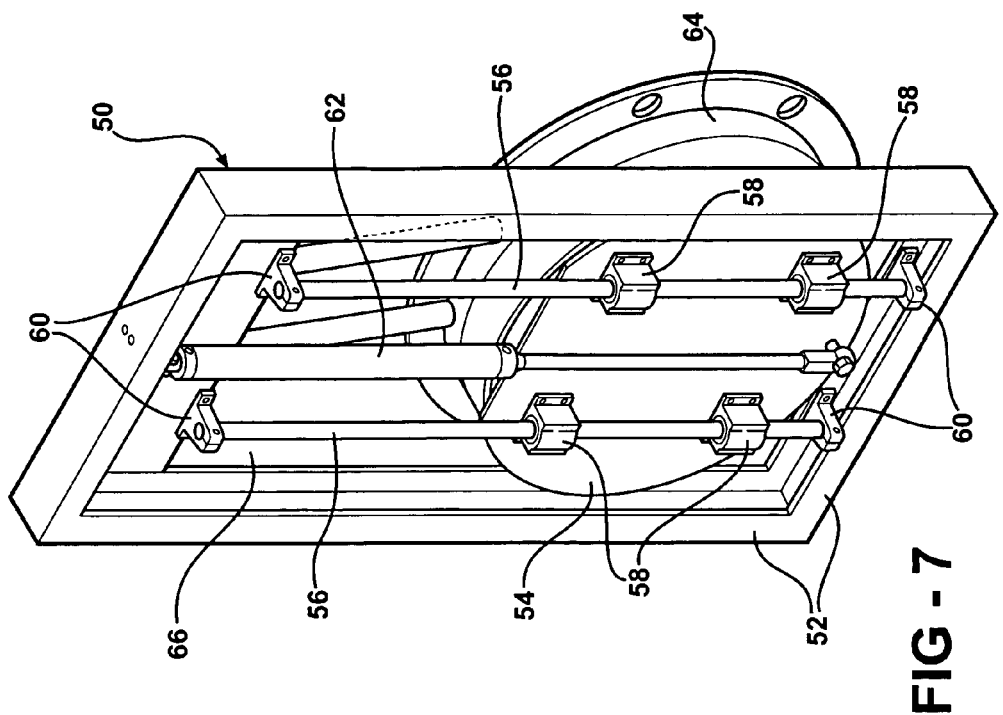
FIG. 7 is a perspective view of the valve mechanism of the subject invention in the closed position.
Figure 6:
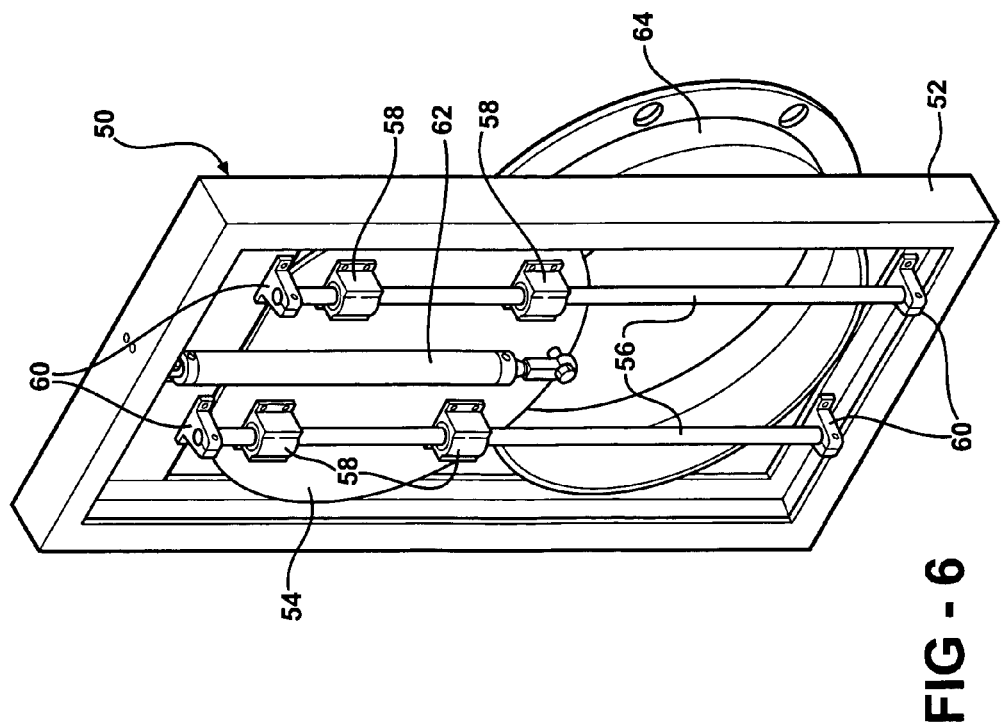
FIG. 6 is a perspective view of the valve mechanism of the subject invention in the open position.

The valve mechanism 50 includes a frame 52 and a valve plate 54 slidably supported by the frame 52 for movement between open and closed positions, as shown in FIGS. 6 and 7 respectively. The frame 52 includes at least one and preferably two rails 56 and the valve plate 54 includes at least one and preferably four rail couplings 58 for engaging and sliding along the rails 56. Each rail coupling 58 is defined by a sleeve presenting a circular bore surrounding a circular rod defining each rail 56. A bushing may be disposed within the bore of each coupling 58 to act as a bearing against the rail 56. A plurality of fasteners in the form of bolts and nuts attach the couplings 58 to the valve plate 54. The bottoms and tops of the rods defining the rails 56 are attached to the frame 52 by stanchions 60.

The valve mechanism 50 includes a pneumatic actuator 62 supported by the frame 52 for sliding the valve plate 54 rectilinearly along the rails 56 between the open and closed positions.

An inlet collar 64 is supported by the frame 52 and adapted for attachment to the inlet 44. The frame 52 defines a rectangle having long sides adjacent the sides of the collar 64 and one short side defining a bottom close adjacent the collar 64 and one short side defining a top spaced from the collar 64. The rails 56 extend between the top and bottom of the rectangle defining the frame 52 and the actuator 62 extends between the top of the rectangle defining the frame 52 and the valve plate 54. The frame is made up of channel members having inwardly directed flanges that define an axial thickness and the valve plate 54 is disposed in that thickness, i.e., between the axial extremes or faces of the frame 52. Sheets or panels 66 close these opposite faces of the frame 52 and a collar extension 68 extends through the panel 66 on the inlet side or face of the frame 52. Consequently, the valve plate 54 moves up and down in a closed space within a housing defined by the frame 52 and sheets 66. The collar 64 is circular in cross section and extends axially from between the sides of the frame 52 and struts 70 extend between the top of the frame 52 and the collar 64 to act structural reinforcements for supporting the collar 64. As alluded to above, the axially spaced panels 66 surround the collar 64 and collar extension 68 by extending to and closing the frame 52.

Figure 9:
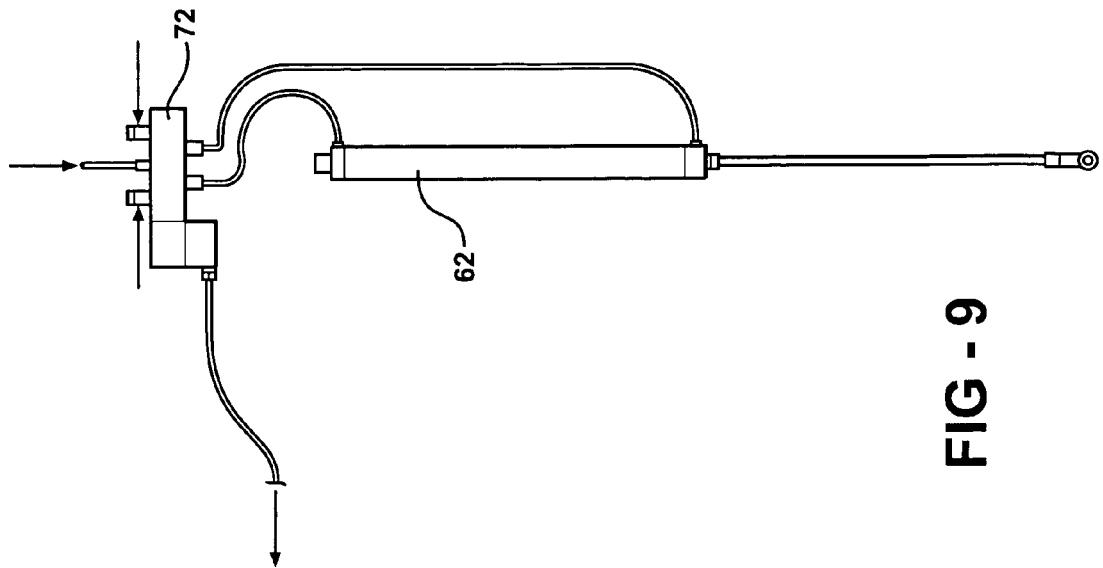
FIG. 9 is a schematic view of the actuator and control valve for controlling the valve mechanism of the subject invention.
Figure 8:
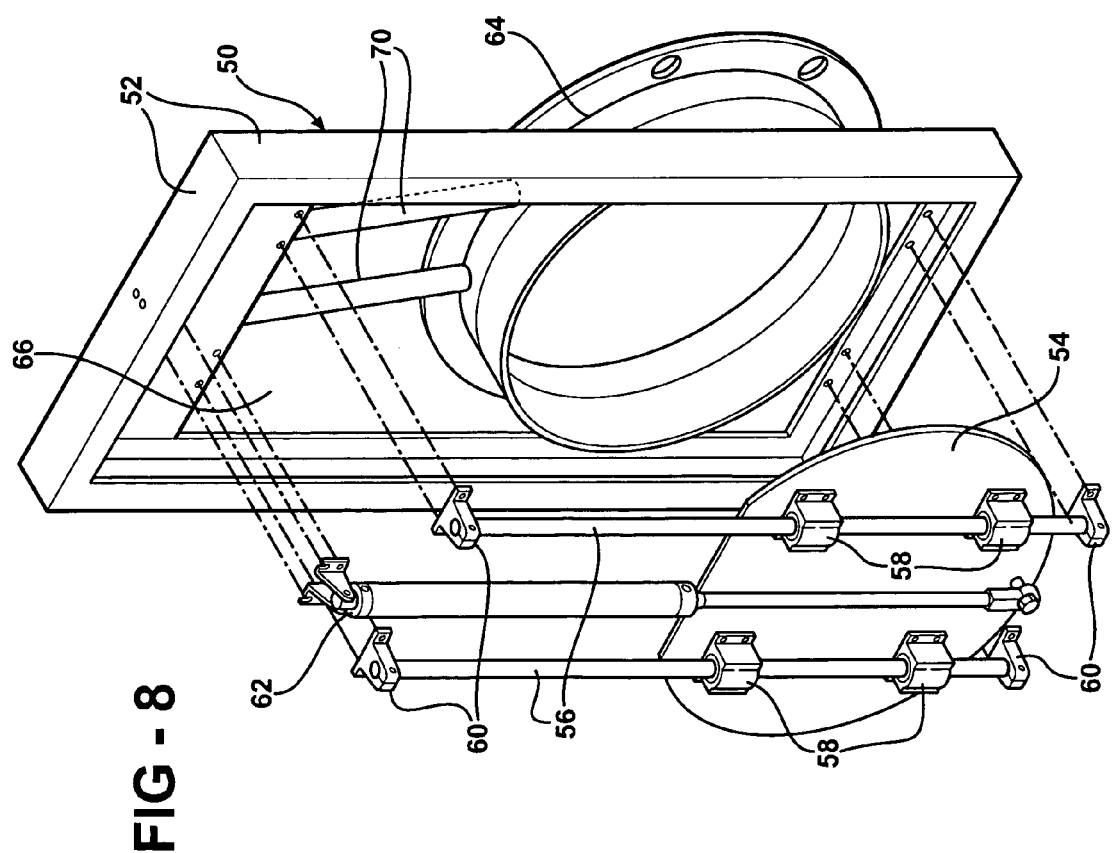
FIG. 8 is an exploded perspective view of the valve mechanism of the subject invention.

The pneumatic actuator 62 is shown schematically in FIG. 9 wherein a control valve 72 controls the flow of air to the pneumatic actuator 62 to raise and lower the valve plate 54. The control valve 72 is appropriately controlled by a centralized central processing unit that determines the demand for airflow through the blower assembly 10.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. In addition, the reference numerals in the claims are merely for convenience and are not to be read in any way as limiting.

What is claimed is:

1. An assembly (10) for blowing liquids from a vehicle comprising;

a plenum (12) for distributing air, at least one nozzle (16, 18) for directing air from said plenum toward a vehicle, and a blower system (40) having an inlet (44) for sucking in air and an outlet (46) for supplying pressurized air to said plenum (12) for distribution to said nozzle (16, 18), said assembly characterized by a valve mechanism (50) disposed oversaid inlet (44) for controlling the amount of air sucked into said inlet (44), said valve mechanism (50) including a frame (52) and a valve plate (54) slidably supported by said frame (52) for movement of said valve plate (54) rectilinearly and transversely to said inlet (44) between open and closed positions.

2. The assembly as set forth in claim 1 wherein said frame (52) includes at least one rail (56) and said valve plate (54) includes at least one rail (56) coupling (58) for engaging and sliding along said rail (56).

3. The assembly as set forth in claim 2 wherein said valve mechanism (50) includes an actuator (62) supported by said frame (52) for sliding said valve plate (54) rectilinearly along said rail (56) between said open and closed positions.

4. The assembly as set forth in claim 3 including an inlet collar (64) supported by said frame (52) and adapted for attachment to said inlet (44).

5. The assembly as set forth in claim 4 wherein said frame (52) defines a rectangle having long sides adjacent the sides of said collar (64) and one short side defining a bottom adjacent said collar (64) and one short side defining a top spaced from said collar (64).

6. The assembly as set forth in claim 5 wherein said rails (56) extend between said top and bottom of said rectangle defining said frame (52).

7. The assembly as set forth in claim 5 wherein said actuator (62) extends between said top of said rectangle defining said frame (52) and said valve plate (54).

8. The assembly as set forth in claim 5 wherein said collar (64) is circular in cross section and extends axially from between said sides of said frame (52).

9. The assembly as set forth in claim 5 including struts (70) extending between said top of said frame (52) and said collar (64).

10. The assembly as set forth in claim 5 including a panel (66) surrounding said collar (64) and extending to and closing said frame (52).

11. The assembly as set forth in claim 10 including a second panel (66) axially spaced from said first mentioned panel (66) for closing said frame (52).

* * * * *